United States Patent [19]
Nojima

[11] Patent Number: 5,958,112
[45] Date of Patent: Sep. 28, 1999

[54] AIR-CLEANING APPARATUS

[75] Inventor: Kouzaburou Nojima, Tokyo, Japan

[73] Assignee: Kabushiki Kaisya O-Den, Tokyo, Japan

[21] Appl. No.: 08/890,219

[22] Filed: Jul. 9, 1997

[30] Foreign Application Priority Data

Jul. 10, 1996 [JP] Japan .................. H8-180462

[51] Int. Cl.⁶ .................................. B03C 3/011
[52] U.S. Cl. ..................... 96/55; 55/359; 55/385.1; 96/58; 96/63; 96/97
[58] Field of Search .................. 96/97, 55, 57, 96/222, 223, 58, 63; 55/385.1, 359, DIG. 36

[56] References Cited

U.S. PATENT DOCUMENTS

| | | | |
|---|---|---|---|
| 4,163,650 | 8/1979 | Watson et al. | 96/57 |
| 4,854,949 | 8/1989 | Giles, Sr. et al. | 55/DIG. 36 |
| 4,902,316 | 2/1990 | Giles, Sr. et al. | 55/DIG. 36 |
| 5,060,717 | 10/1991 | Morita et al. | 96/55 X |
| 5,063,906 | 11/1991 | Rogers et al. | 96/57 X |
| 5,154,161 | 10/1992 | Rogers et al. | 96/57 X |
| 5,704,955 | 1/1998 | Giles | 96/55 X |

FOREIGN PATENT DOCUMENTS

| | | |
|---|---|---|
| 0 030 400 | 6/1981 | European Pat. Off. . |
| 2 035 789 | 2/1971 | Germany . |
| 16-22486 | 11/1941 | Japan . |
| 18-30615 | 12/1943 | Japan . |
| 58-3948 | 4/1957 | Japan . |
| 45-3511 | 2/1970 | Japan . |
| 45-21172 | 8/1970 | Japan . |
| 54-20691 | 7/1979 | Japan . |
| 59-3077 | 1/1984 | Japan . |
| 59-17387 | 5/1984 | Japan . |
| 60-28518 | 8/1985 | Japan . |
| 1-21815 | 6/1989 | Japan . |
| 7-150850 | 6/1995 | Japan . |

OTHER PUBLICATIONS

Elektro–Technik, vol. 33, No. 12/13, pp. 12, "Klein–Elektrofilter", Mar. 30, 1951.

Electronics, vol. 34, No. 2, pp. 30, "Electronic Air Cleaning Planned for Homes", Jan. 31, 1961.

*Primary Examiner*—Richard L. Chiesa
*Attorney, Agent, or Firm*—Oblon, Spivak, McClelland, Maier & Neustadt, P.C.

[57] ABSTRACT

An air-cleaning apparatus is mounted on a wall to collect particulates suspended in the air through electrical control. In the air-cleaning apparatus, a box is mounted on a wall to house therein a dust-collection unit and an air fan such as cross-flow fan for blowing air. The dust-collection unit collects the particulates suspended in the air by imparting a corona electric charge to these particulates, i.e., by rendering them an electrostatic charge. The box of the air-cleaning apparatus is provided with an air outlet in its lower section and also provided with a forward-protruding air duct in its upper section. The forward-protruding air duct is provided with an air inlet in its leading edge portion.

11 Claims, 14 Drawing Sheets

AIR-CLEANING APPARATUS

BACKGROUND OF THE INVENTION

1. Field of the Invention

The present invention relates to an air-cleaning apparatus which is mounted on a wall and collects particulates within the air by means of electrical control.

2. Description of the Prior Art

The air-tight construction of offices, restaurants, recreation facilities, factories, homes and other buildings in recent years means that dust from cigarette smoke, toner from photocopiers, paper dust from photocopying paper, foul odours and other harmful substances exercise a detrimental effect on the health of persons working there, and lead to a high incidence of soiling of equipment and machinery. This has resulted in the popularisation of air-cleaning devices which are installed in offices and elsewhere in order to collect suspended particulates of toner, cigarette smoke and other pollutants from the air within the room and thus remove foul odours.

One hitherto well-known type of air-cleaning apparatus of this sort is mounted on a wall.

As may be seen from FIG. 14, a conventional wall-mounted air-cleaning apparatus comprises a pre-filter 1, an electrostatic suction-type dust-collection unit 2, a deodorising filter 3 made of activated carbon fibre or a similar material, a cross-flow fan 4, and a power supply which is not shown in the drawing. In a configuration of this sort, when the device is in operation, polluted room air 5 containing suspended particulates of toner, cigarette smoke and other pollutants is drawn in through an inlet 7 in the vicinity of the ceiling 6 by means of the suction force of the cross-flow fan 4. It first passes through the pre-filter 1, where the larger suspended particles are ensnared. It is then fed to the dust-collection unit 2, where the suspended particulates in the room air 5 are collected by imparting a corona electric charge and rendering them electrostatic. Finally it passes through the deodorising filter 3 and is purified by the adsorption and removal of any offensive odours. The purified room air 8 is expelled again by the expulsion force of the cross-flow fan through an outlet 9 in the direction of the floor 10. Thus, the room air circulates through the air-cleaning apparatus mounted on the wall 11 and is thereby purified. It may be added that the dust-collection unit 2, pre-filter 1, deodorising filter 3 and other parts are removed by opening a door 12, and cleaned for re-use when they become soiled.

However, wall-mounted air-cleaning devices are generally compact and easy to install. This means that while the inlet 7 and the outlet 9 are located respectively at the top and bottom of the device, the vertical dimension of the device as such is small. Consequently, as the drawing shows, purified air 8 expelled from the outlet 9 in the direction of the floor 10 is affected by the negative pressure which generates in the vicinity of the inlet 7, as a result of which it is unable to circulate widely within the room and returns by the shortest route to the inlet 7 in the vicinity of the ceiling 6. This has the disadvantage of rendering it impossible to remove effectively the cigarette smoke 13 and other pollutants with which the room is full.

A further disadvantage concerns the door 12 of a wall-mounted air-cleaning device. While it is true to say that one which pulls downwards with the aid of gravity is most suitable in that it allows the dust-collection unit 2 and other parts to be removed and replaced smoothly, there is a risk, as the drawing demonstrates, that if the door is opened forcefully it may come into contact with or crash into the external cover plate of the device, scraping the paint on it and on the door 12 with damaging effect to the appearance of the device.

SUMMARY OF THE INVENTION

It is an aim of the present invention, which has been perfected in view of the abovementioned circumstances, to provide a wall-mounted electric dust-collection device which is able to allow considerable circulation of air within a room, thereby facilitating the swift and effective removal of suspended particulates from toner, cigarette smoke and other pollutants.

With the object of solving the abovementioned problem, as defined in a first aspect of the present invention there is provided a wall-mounted air-cleaning apparatus comprising a wall-mounted box housing a dust-collection unit which collects particulates suspended in the air by imparting a corona electric charge and rendering them electrostatic, along with an air fan for blowing air, the lower section of the abovementioned box being provided with an air outlet, while the upper section thereof is provided with a forward-protruding airway which has an air inlet on its leading edge.

In the foregoing, a mode wherein the abovementioned air fan is housed on the downstream side of the dust-collection unit is preferable inasmuch as the fan is less prone to soiling.

A mode wherein the forward external cover plate which constitutes the abovementioned box is provided with an aperture for the purpose of attaching and detaching the dust-collection unit, a door being fitted to the aperture whereby it may be opened and closed, is also preferable for the purpose of attaching and detaching the dust-collection unit safely and simply.

As defined in a second aspect of the present invention there is provided a wall-mounted air-cleaning apparatus comprising a wall-mounted box housing a dust-collection unit which collects particulates suspended in the air by imparting a corona electric charge and rendering them electrostatic, along with a pre-filter, a deodorising filter and an air fan, the pre-filter, dust-collection unit, deodorising filter and air fan being positioned in that order in the direction of the air-flow, the lower section of the abovementioned box being provided with an air outlet, while the upper section thereof is provided with a forward-protruding airway which has an air inlet on its leading edge.

In the foregoing second aspect, a mode is preferable wherein the forward external cover plate which constitutes the abovementioned box is provided with an aperture for the purpose of attaching and detaching the abovementioned pre-filter, dust-collection unit and deodorising filter, a door being fitted to the aperture whereby it may be opened and closed.

Moreover, in the foregoing first and second aspects, a mode wherein the abovementioned air duct protrudes forward for a distance of approximately 15–100 cm from the forward surface of the abovementioned box is preferable.

A mode wherein the abovementioned airway can freely be attached to and detached from the abovementioned box is preferable, and in particular one having a plurality of types of differing lengths and shapes, so that users themselves can easily select and exchange them to suit the size of room, number of users, and their personal likes.

A preferable mode is one wherein the air-cleaning unit comprises needle electrodes for the purpose of charging particulates within the air by causing corona discharges around their tips, tube-shaped collector electrodes corresponding to the needle electrodes and provided for the purpose of attracting and collecting the charged particulates by means of static electricity, and deflecting electrodes which are arranged in such a way as to be inserted within the collector electrodes for the purpose of imparting a deflecting force on the abovementioned charged particles in the direction of the abovementioned collector electrodes.

Moreover, considerations of neatness give preference to a mode wherein the abovementioned door which is fitted to the abovementioned aperture so that it may be opened and closed is provided with stoppers for the purpose of preventing it from coming into contact or colliding with the forward external cover plate of the abovementioned box when it is open, the stoppers being invisible when the door is closed.

In that it eliminates the risk of damage to the external cover plate of the device, a preferable mode is one wherein the mechanism which serves to open and close the abovementioned door comprises a first hinge whereof one member is fixed to the rear surface of the external cover plate, a first stopper for the purpose of preventing the other member of the first hinge from rotating too far, a second hinge whereof one member is fixed to the rear surface of the lower edge of the door and the other member is fixed to the other member of the abovementioned first hinge, and a second stopper for the purpose of preventing the abovementioned door from rotating too far.

In the abovementioned first and second aspects, while the polluted room air is drawn in at the top of the box through an aperture on the leading edge of an airway which protrudes forwards parallel to the ceiling, the purified air is simply blown out into the room (towards the floor, for instance) through an aperture at the bottom of the wall-mounted box. The opposite mode, whereby air is drawn in through an aperture at the bottom of the box and clean air expelled on the ceiling side, is not adopted. This is because attention was paid to a frequently observed natural phenomenon, that because its temperature is initially higher than that of the surrounding air, cigarette smoke swirls up to the ceiling on rising air currents and collects there as if crawling along the surface. In a room environment of this sort it would not be feasible to draw cigarette smoke in properly if room air were drawn in on the side nearer the floor. Meanwhile, a mode whereby air is expelled on the ceiling side would be inconvenient in that it would serve to stir up cigarette smoke which had collected along the ceiling and diffuse it unnecessarily throughout the room, thus proffering no hope for the swift and effective removal of dust.

On the other hand, the mode whereby air is drawn in on the ceiling side is much preferable in that it does not run contrary to natural convection, and allows cigarette smoke which has collected along the ceiling to be drawn in effectively.

Moreover, in the abovementioned first and second aspects the box which is mounted on the wall houses only the dust-collection unit and fan, while the airway which protrudes horizontally from the top of the box is literally an air duct and is not used as a casing to house heavy items such as the dust-collection unit air fan. This means that because the heavy items are housed in the wall-mounted box, the structure is stable and provides less cause for concern in the eventuality of an earthquake.

If a mode were to be adopted whereby the dust-collection unit, fan and other heavy items were housed in the horizontally protruding airway, the center of gravity would be thrust forward, making the device extremely unstable and giving rise to concern in the eventuality of an earthquake. The operation of attaching and detaching heavy items would also be very complicated and dangerous if they were housed in the airway which protrudes horizontally along the ceiling.

DETAILED DESCRIPTION OF THE PREFERRED EMBODIMENT

There follows a description of the preferred embodiment of the present invention with reference to the drawings.

Figure 1:
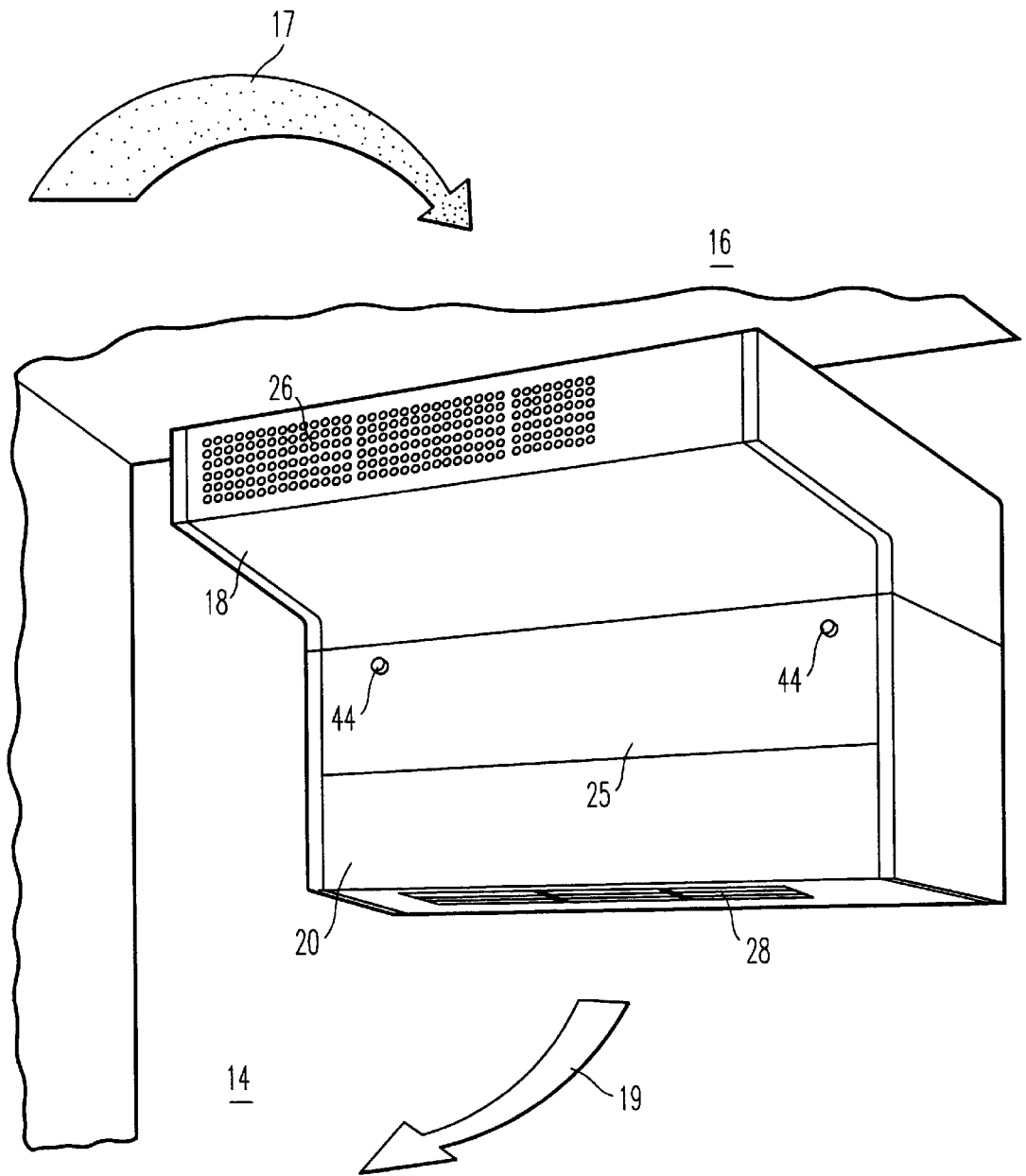
FIG. 1 is an oblique view showing the external configuration of a wall-mounted air-cleaning apparatus which forms an embodiment of the present invention.
Figure 2:
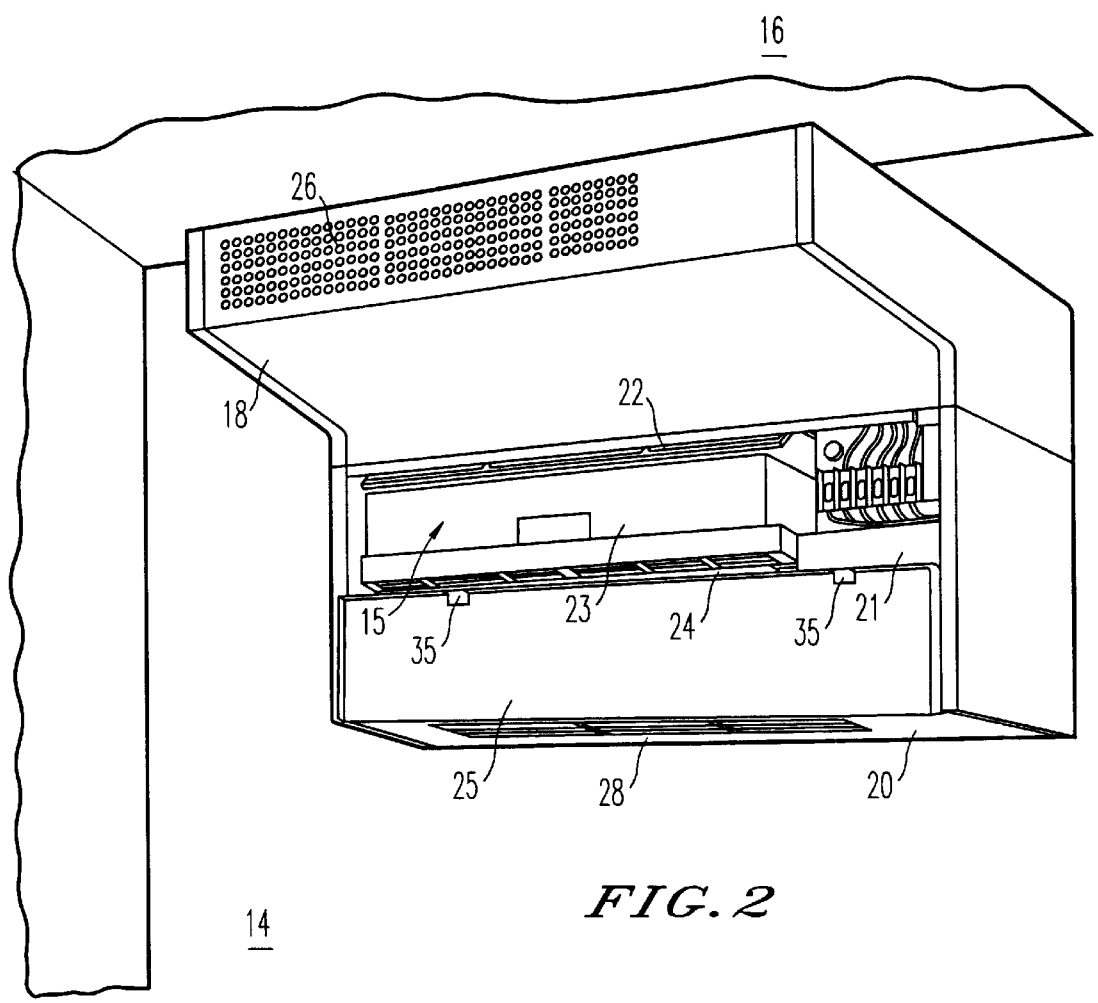
FIG. 2 is an oblique view in which part of the internal configuration of the same air-cleaning apparatus can be seen.
Figure 3:
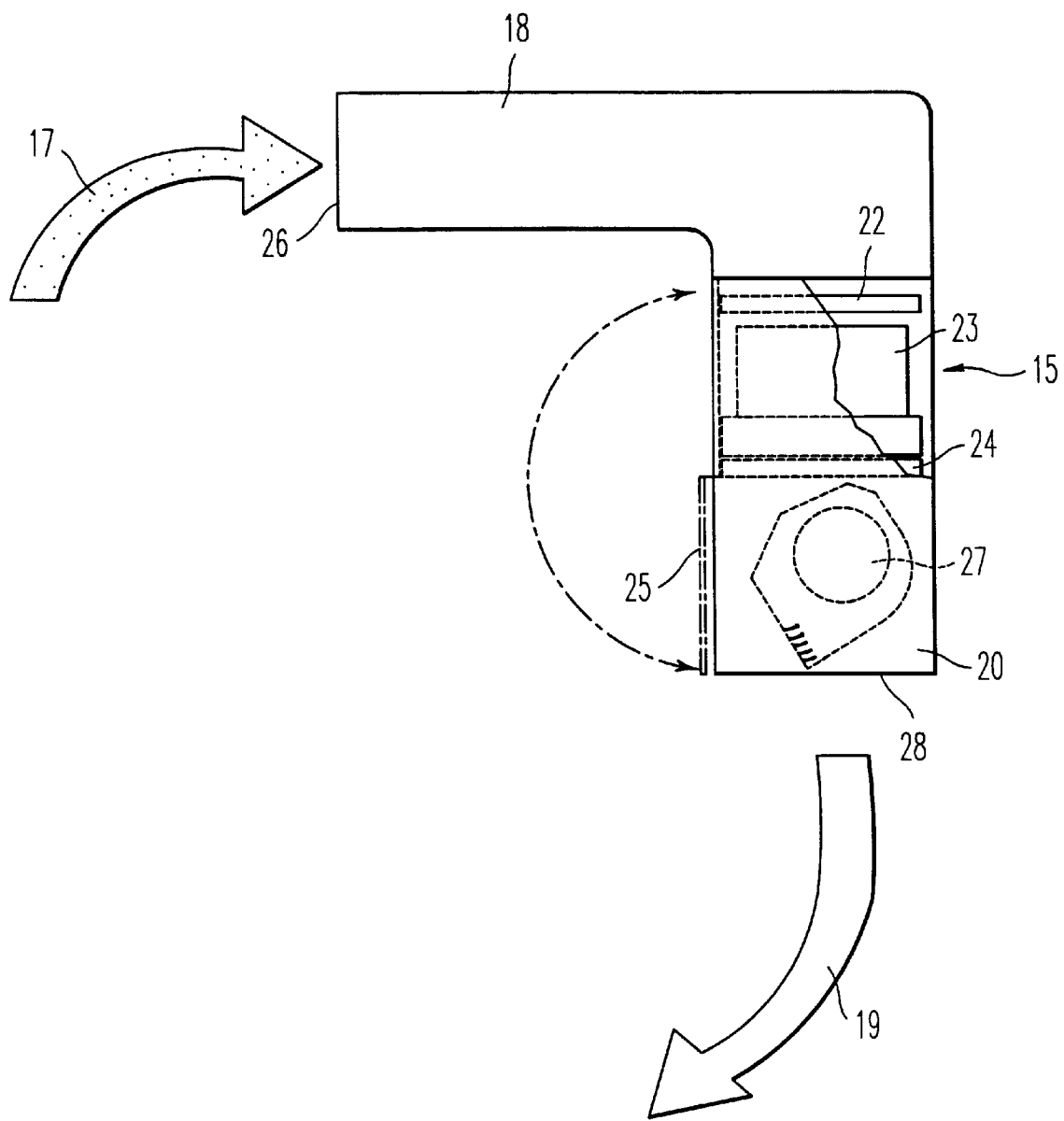
FIG. 3 is a side view of the same air-cleaning apparatus, in which the internal configuration is indicated by imaginary lines.
Figure 4:
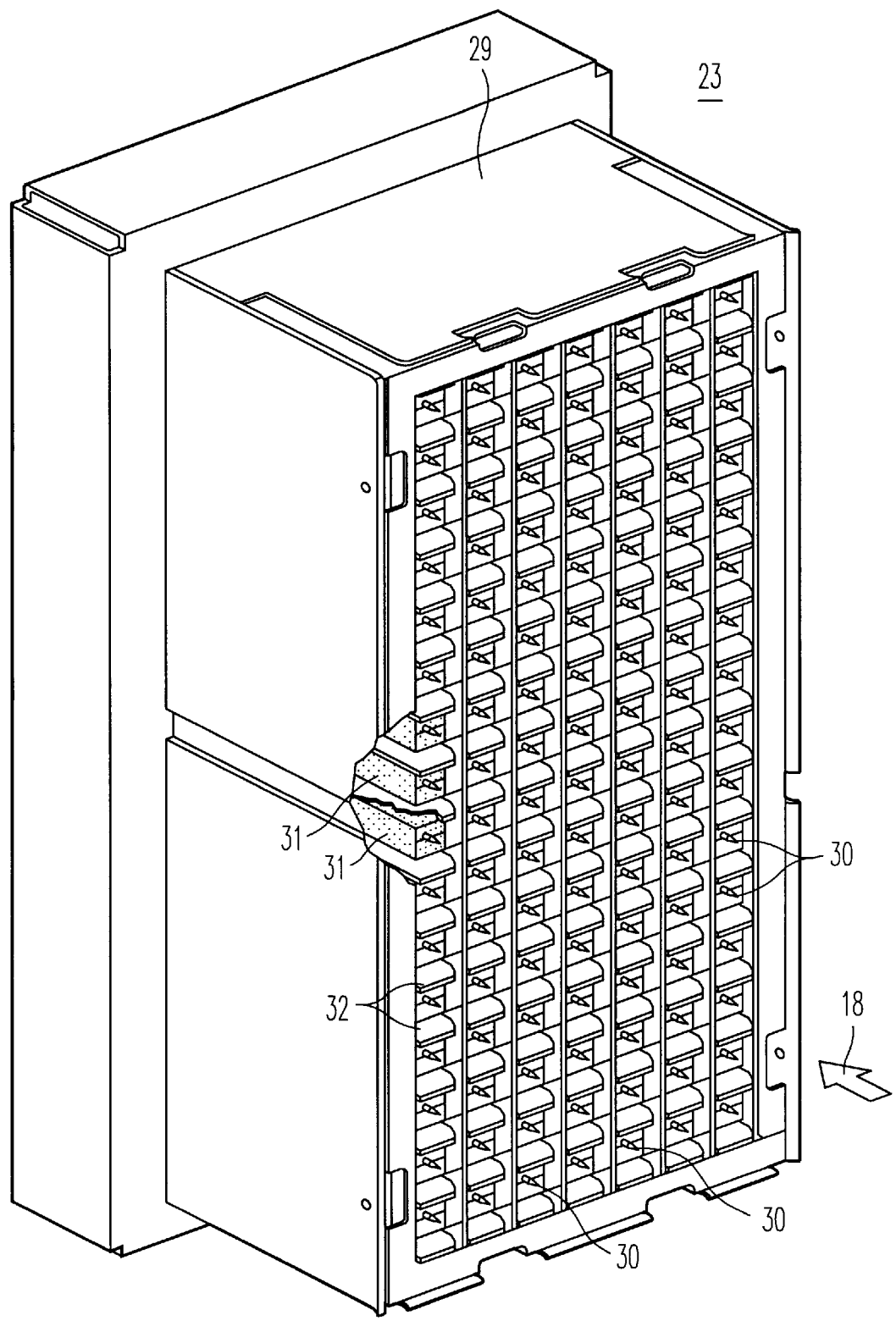
FIG. 4 is an oblique view showing the configuration of the dust-collection unit which forms the main part of the same air-cleaning apparatus.
Figure 5:
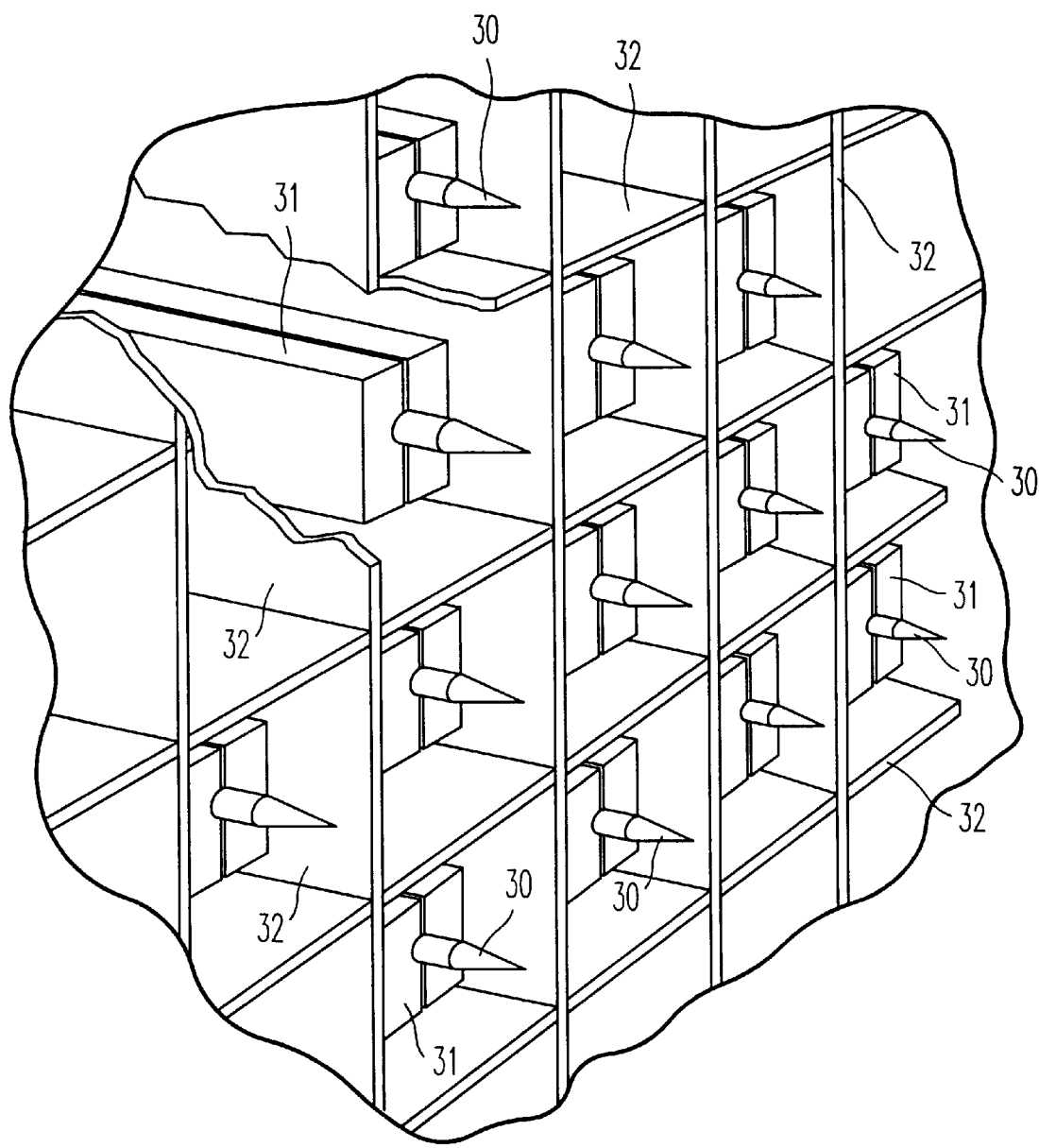
FIG. 5 is an enlarged oblique view showing part of the same dust-collection unit on a larger scale.
Figure 6:
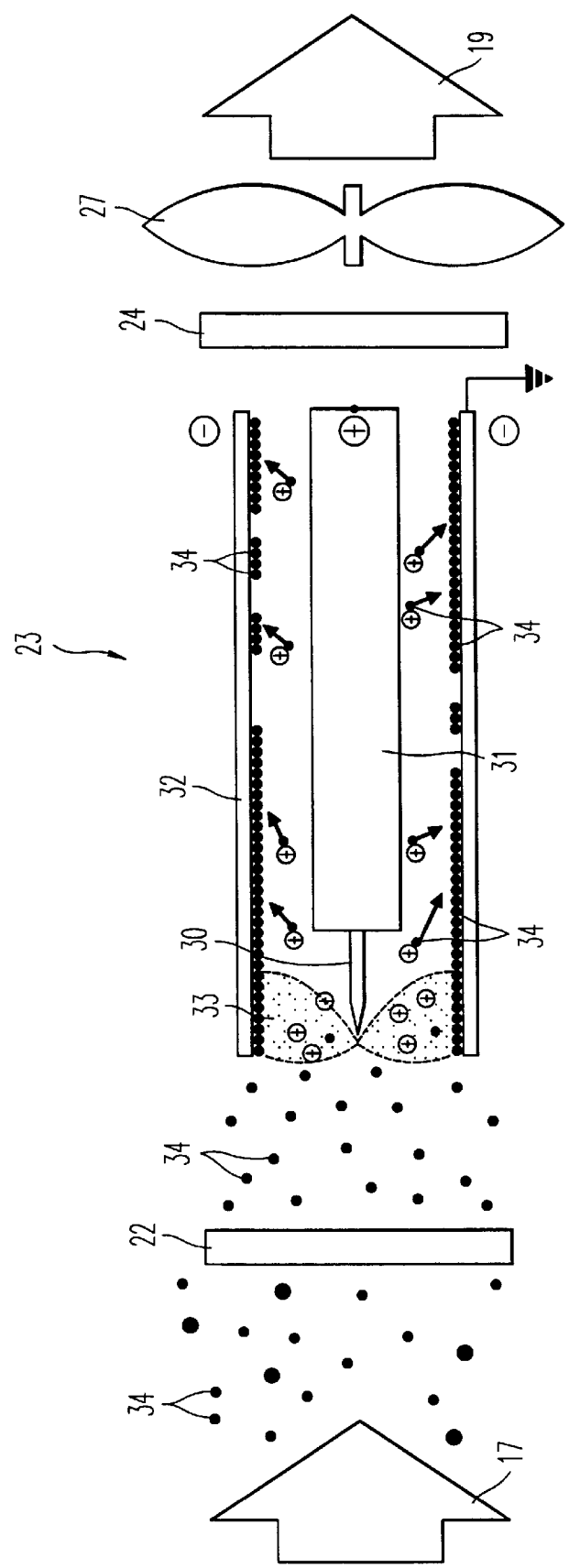
FIG. 6 is a diagram which serves to elucidate the principle of dust-collection which is adopted in the same dust-collection unit.

FIG. 1 is an oblique view showing the external configuration of a wall-mounted air-cleaning apparatus which forms an embodiment of the present invention; FIG. 2 is an oblique view in which part of the internal configuration of the same air-cleaning apparatus can be seen; FIG. 3 is a side view of the same air-cleaning apparatus, in which the internal configuration is indicated by imaginary lines; FIG. 4 is an oblique view showing the configuration of the dust-collection unit which forms the main part of the same air-cleaning apparatus; FIG. 5 is an enlarged oblique view showing part of the same dust-collection unit on a larger scale; and FIG. 6 is a diagram which serves to elucidate the principle of dust-collection which is adopted in the same dust-collection unit.

Firstly, the overall configuration of the air-cleaning apparatus will be described with reference to FIGS. 1–3.

This air-cleaning apparatus is a device for mounting on an interior wall 14 such as that of an office for the purpose of collecting particulates within the air by means of electrical control. As may be seen from FIGS. 1–3, it comprises in the main a dust-collection member 15, which is the chief constituent part of the device; an airway (air duct) 18 which is connected to an upper aperture of this dust-collection member 15, takes in room air 17 from the vicinity of the ceiling 16, and feeds it to the dust-collection member 15; an air-blower 20 which is connected to a lower aperture of this dust-collection member 15, and returns air 19 which has been purified in the dust-collection member 15 into the room; and a high-voltage direct-current power supply 21 which supplies direct-current voltage to the dust-collection member 15. Of these, the airway 18 protrudes forward at the top of the box and parallel to the ceiling 16, so that the whole device presents an external appearance which resembles an inverted letter L.

The dust-collection member 15 comprises a pre-filter 22, a dust-collection unit 23, and a deodorising filter 24 made of activated carbon fibre or a similar material. These are fitted in such a manner as to be capable of being attached and detached freely, and serve to remove dust and odors from the air 17 which passes through them. The pre-filter 22 is fitted prior to (on the upstream side of the air passage from) the dust-collection unit 23, and ensnares larger particles suspended in the air 17 passing through it. The dust-collection unit 23 collects fine suspended particles, which were not unable to be ensnared in the pre-filter 22, by imparting a corona electric charge and rendering them electrostatic. The deodorising filter 24 is fitted subsequent to (on the downstream side of the air passage from) the dust-collection unit 23. It attracts and removes foul and offensive odours, helping to ensure that the air is purified. Moreover, the forward surface of the dust-collection member 15 forms a rectangular aperture, to which is fitted a door 25 which pulls downwards. At such time as the prefilter 22, dust-collection unit 23, deodorising filter 24 and other parts become heavily soiled as a result of attracting toner, cigarette smoke and other pollutants, the door 25 may be opened by pulling it downwards, the soiled items removed, cleaned and replaced for further use.

The airway 18 protrudes for a distance of 15–100 cm forward in a horizontal direction from the forward surface of the box (forward surface of the dust-collection member 15), and has on its leading edge an inlet 26 made from metal mesh sheeting. This inlet 26 faces in a horizontal direction, and is so configured as to attract the air 17 which has risen to the vicinity of the ceiling 16 (the room air 17 which contains suspended particulates of toner, cigarette smoke and other pollutants) at a site which is some distance removed from the wall 14 on which the air-cleaning apparatus is mounted. Meanwhile, there is an aperture at the rear end of the airway 18 which faces downwards and is connected to an aperture at the upper end of the dust-collection member 15. The abovementioned air-blower 20 is provided with a cross-flow fan 27, which acts in such a manner as to draw the polluted air 17 in through the inlet 26 into the dust-collection member 15, where it is purified, and then expel it in a downward direction towards the floor through an outlet 28 which is fitted with a louvre plate.

There follows an explanation of the principal components of the device.

As FIGS. 4 and 5 show, the dust-collection unit 23 consists of rows of electrodes arranged in grid formation vertically and horizontally, they in turn consisting of needle electrodes 30 shaped like gramophone needles, deflecting electrodes 31 shaped like rectangular columns which support and hold the needle electrodes 30 firm and from the leading surface of which they protrude, and collector cells 32 in the shape of rectangular tubes open at both ends which surround the needle electrodes 30 and deflecting electrodes 31 without coming into contact with them. In this manner, gaps are formed on all sides between the circumference of the needle electrodes 30 and deflecting electrodes 31 on one side and the collector cells 32 on the other, and the air 17 passes through these.

There now follows a description of the operation of the dust-collection unit 23 configured as above, in which reference will be made to FIG. 6. When the high-voltage direct-current power supply 21 is switched on, a positive potential is impressed on the needle electrodes 30 and the deflecting electrodes 31, while a negative potential is impressed on the collector cells 32. Thus, if for example a 5–6 kV direct-current high voltage is applied between these electrodes, a kind of corona discharge occurs around the tips of the needle electrodes 30. This discharge is continuous and stable, and results in the formation of ionisation space areas 33. The polluted room air 17 is drawn in by the action of the cross-flow fan 27 through the inlet 26 on the leading edge of the airway 18, and reaches the ionisation space areas 33. The oxygen, being low in ionisation energy, is disassociated to become plus ions. These attach themselves to particulates of cigarette smoke or other pollutants 34, 34, . . . , endowing them with plus ion charges. When the charged particulates 34, 34, . . . pass between the deflecting electrodes 31 and the collector cells 32, those which are close to the collector cells 32, which have a negative potential, are attracted to them. Meanwhile, those particulates 34, 34, . . . which are at a distance from the pole plates of the collector cells 32 are repelled by the positive potential of the pole plates of the deflecting electrodes in the direction of the pole plates of the collector cells 32, to which they are attracted. In this manner, dust from fine particles of approximately 0.01 mm to relatively large ones of about 10 mm is collected effectively.

Figure 7A:
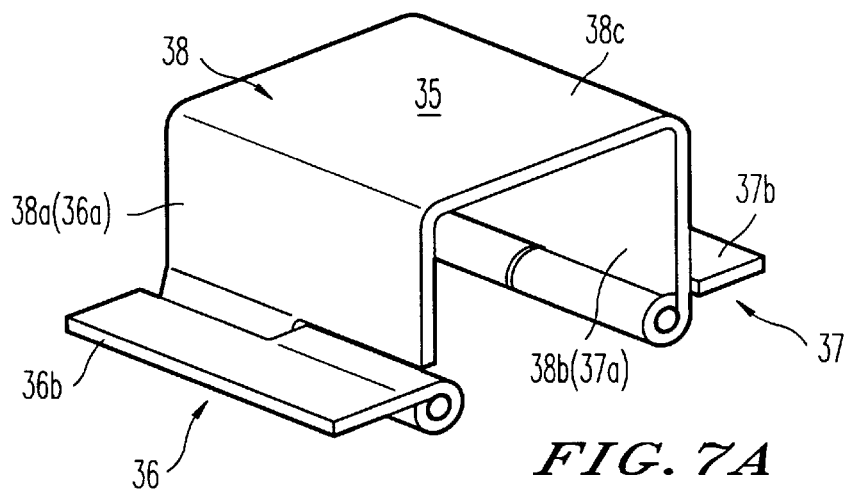
FIG. 7 consists of oblique views illustrating the configuration and basic positions of the hardware which opens and closes the door which is employed in the same air-cleaning apparatus.
Figure 7B:
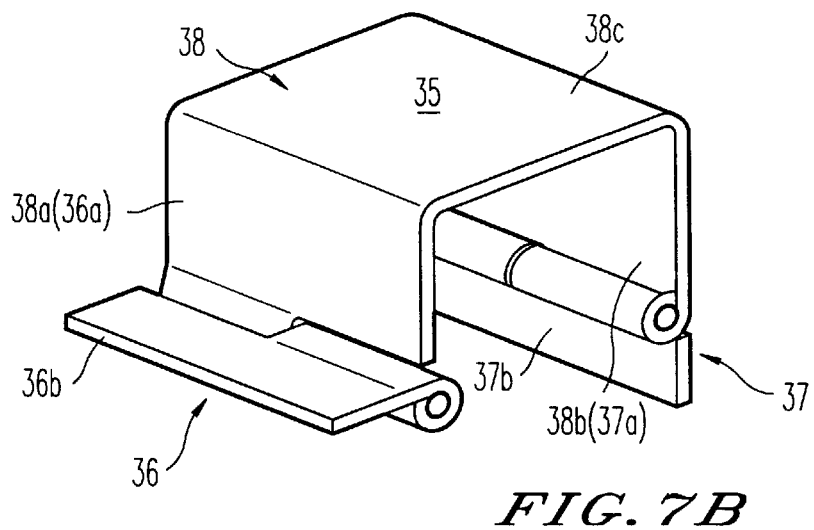
Figure 7C:
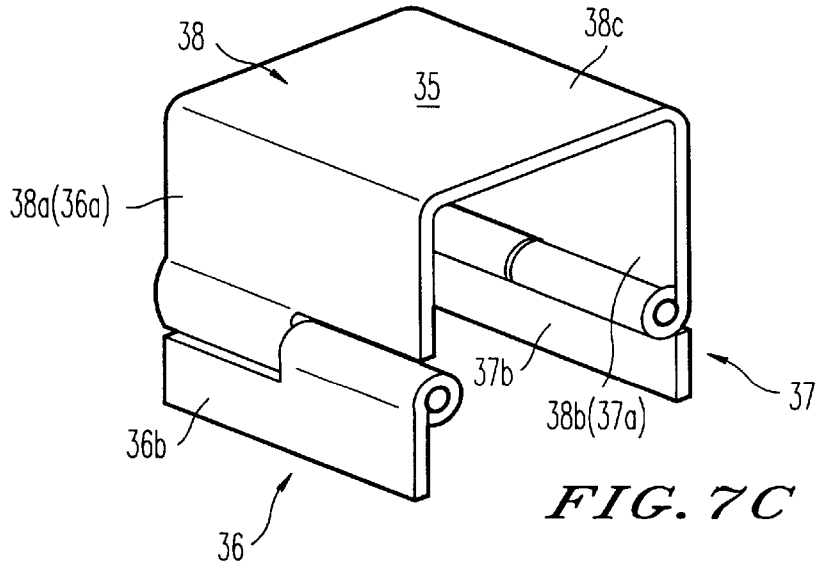
Figure 8:
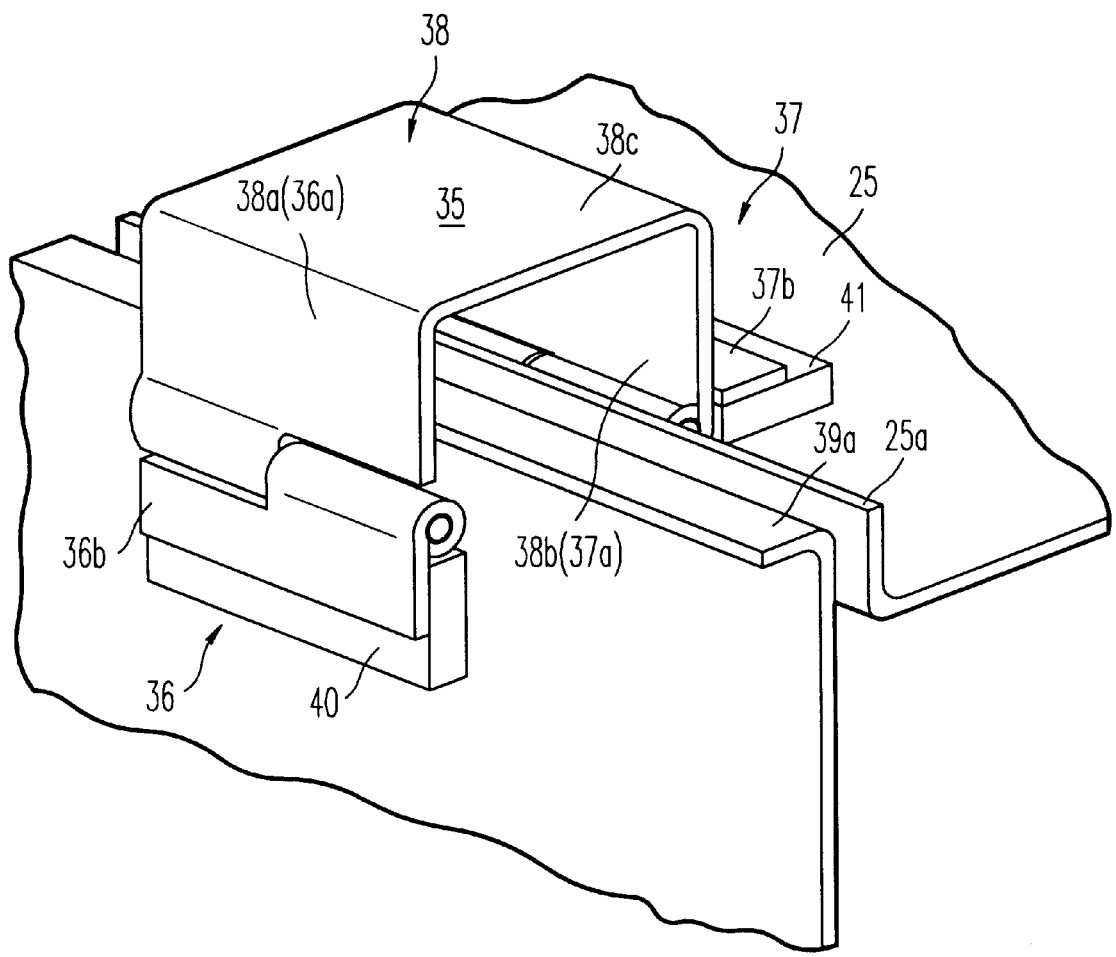
FIG. 8 is an oblique view showing the position of the same hardware attached to the forward external cover plate of the box.
Figure 9:
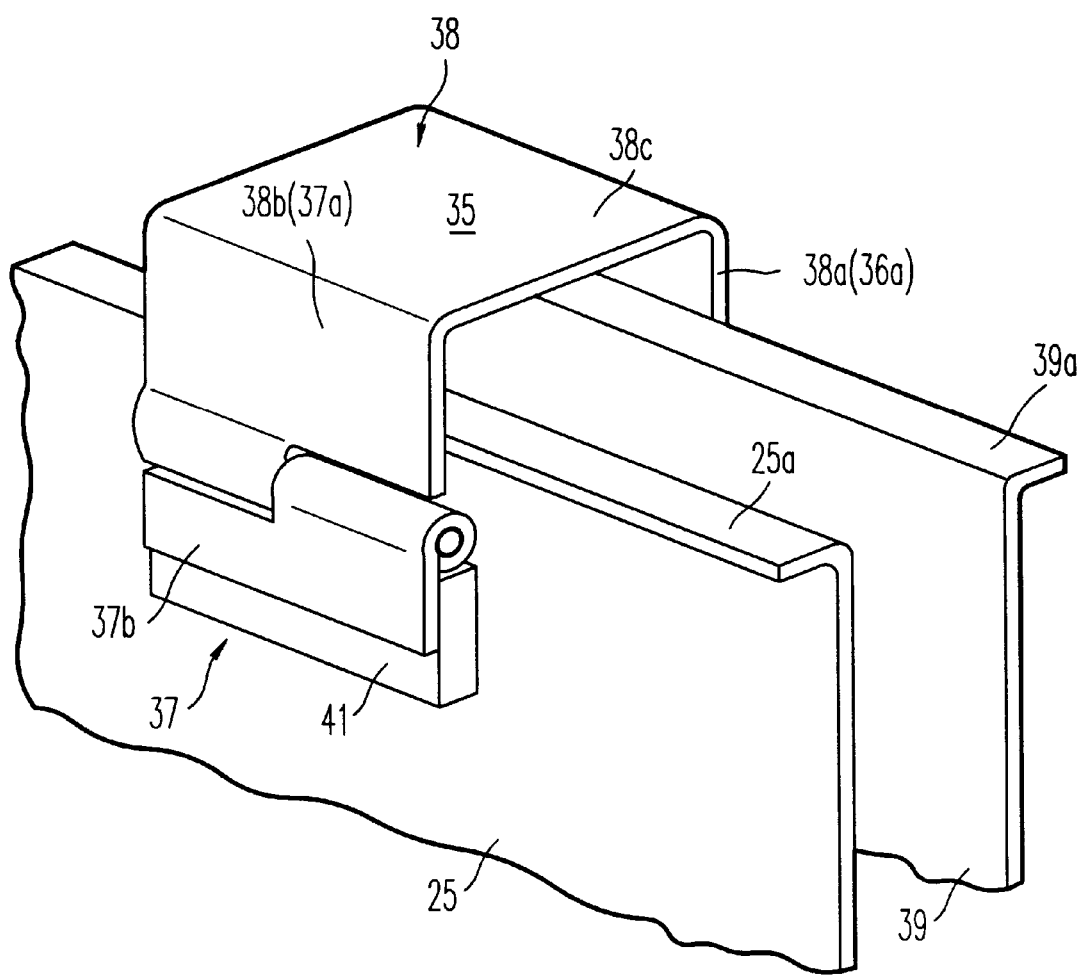
FIG. 9 is an oblique view showing the position of the same hardware when the door is fully open as seen from outside the device.

There follows, with reference to FIGS. 7–9, an explanation of the hardware which allows the door 25 to open and close.

FIG. 7 consists of oblique views illustrating the configuration and basic positions of the hardware; FIG. 8 is an oblique view showing the position of the same hardware attached to the forward external cover plate of the box; and FIG. 9 is an oblique view showing the position of the same hardware when the door is fully open as seen from outside the device.

As may be seen from FIG. 7, this hardware is of a single biaxial structure, consisting of a pair of hinges 36 and 37 joined by a connecting member 38 in the shape of an inverted letter U with straight sides and a flat top. The sides or flanges 38a and 38b of this connecting member 38 each form one rotatable member 36a and 37a of the hinges 36 and 37. The opposite rotatable members 36b and 37b of the hinges 36 and 37 are fixed respectively to the forward external cover plate 39 of the box and to the door 25, so that the door 25 can be opened and closed by pulling it down and pushing it up.

In other words, this air-cleaning apparatus has a door 25 which is attached to the rectangular aperture on the forward surface of the dust-collection member 15 in such a manner that it can be opened and closed. This is effected by attaching hardware 35 of the abovementioned structure in two locations on the rear surface of its upper edge (cf. FIG. 2). As FIGS. 8 and 9 show in greater detail, the hardware 35 is welded on with the aid of spacers 40 and 41 in such a manner that the opposite member 36b of the hinge 36 is attached to the upper part of the rear surface of the forward external cover plate 39, while the opposite member 37b of the other hinge 37 is attached to the lower part of the rear surface of the door 25.

As FIG. 8 shows, the upper edge 39a of the forward external cover plate 39 is bent backwards at roughly right-angles. This serves to ensure that the device looks neat, and also functions as a stopper which prevents the connecting member 38 of the hardware 35 from rotating too far. Similarly, as will be seen from FIG. 9, the lower edge 25a of the door 25 is bent backwards at roughly right-angles. Apart from ensuring that the device looks neat, this serves as a stopper to prevent the door 25 from rotating too far. It should be added that the length of the web 38c of the connecting member 38, which corresponds to the distance between the two opposing flanges 38a and 38b, is determined in such a manner as to be greater than the sum total of the width of the upper edge 39a of the forward external cover plate 39 and that of the lower edge 25a of the door 25 (cf. FIG. 9).

In the explanation of the action of this embodiment which follows, reference will be made to FIGS. 10–12, and it will be assumed that the air-cleaning apparatus has been mounted on the wall 14 of a smoking-room in an office or elsewhere.

Figure 10:
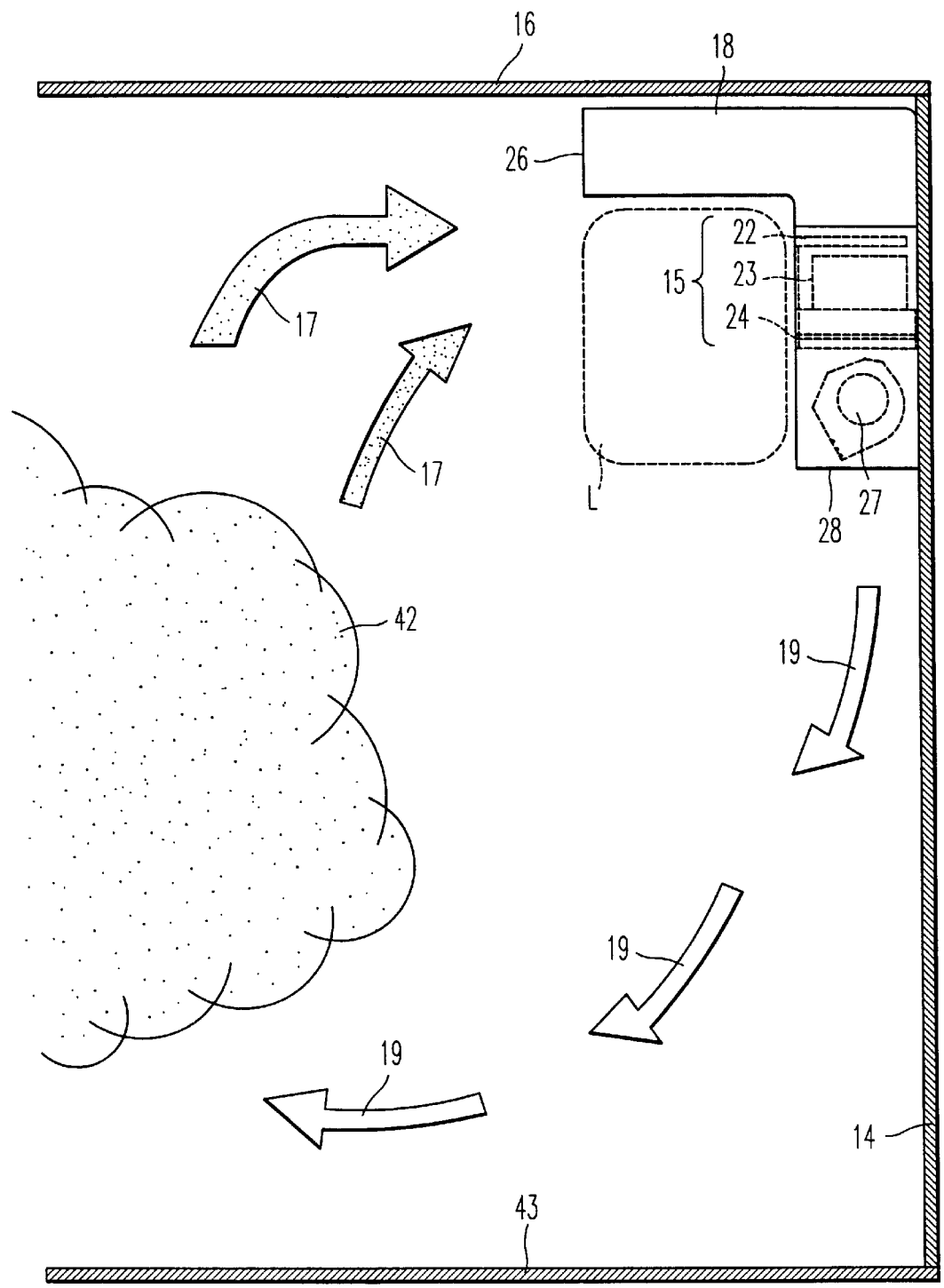
FIG. 10 is a schematic representation of the interior of a room, and serves to illustrate the manner in which the same dust-collection apparatus collects dust.
Figure 11A:
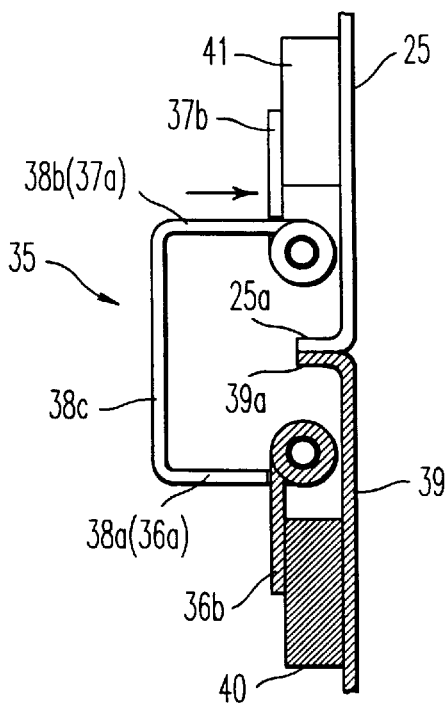
FIGS. 11(a), 11(b) and 11(c) are operation diagrams which serve to illustrate the opening and closing action of the same hardware.
Figure 11B:
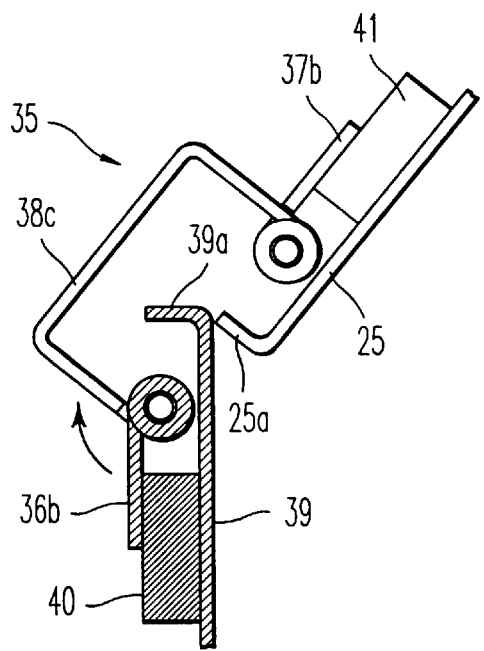
Figure 11C:
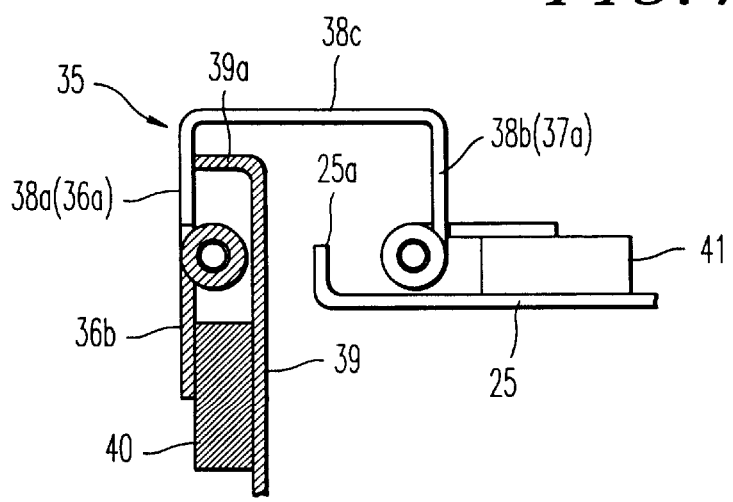

FIG. 10 is a schematic representation of the interior of the room, and serves to illustrate the manner in which the dust-collection apparatus of the abovementioned configuration collects dust;

FIGS. 11 and 12 consist of action diagrams which serve to illustrate the opening and closing action of the hardware 35.

As FIG. 10 demonstrates, the air-cleaning apparatus is mounted in the angle between the ceiling 16 and the wall 14 in such a manner that the airway 18 is in contact with or in the close vicinity of the ceiling 16, while the inlet 26 protrudes in the direction of the center of the ceiling 16.

When the device is in operation, polluted room air 17 containing cigarette smoke (suspended particulates), which has risen as far as the ceiling 16, is drawn into the airway 18 through the inlet 26 as a result of the suction force of the cross-flow fan 27. It passes first through the pre-filter 22 of the dust-collection member 15, where the larger suspended particles are ensnared. It is then fed into the dust-collection unit 23, and the cigarette smoke 42 is collected by imparting a corona electric charge and rendering it electrostatic. Lastly, the air passes through the deodorising filter 24, where the odor of cigarettes is adsorbed and removed, thus ensuring that the air is clean. After being purified in this manner, the room air 19 is expelled again by the expulsion force of the cross-flow fan from the outlet 28 of the air-blower 20 in the direction of the floor 34.

Thus, inasmuch as the inlet 26 and outlet 28 are located at opposite ends of the L-shaped device, and the angle L acts as a buffer zone for the air flow, distancing the negative pressure in the vicinity of the outlet 28, the clean air 19 sinks right down to the vicinity of the floor 43. It then crawls or advances along the floor 43 in accordance with the natural convection current to the center of the room and the opposite wall, after which it rises to the ceiling 16.

Consequently, the configuration adopted in this embodiment makes it possible to ensure a substantial degree of circulation of room air 17 and 19 (enhances the efficiency of the circulation), so that cigarette smoke 42 and other suspended particulates can be removed effectively and swiftly.

If through prolonged use of the abovementioned air-cleaning apparatus the dust-collection unit 2, pre-filter 1, deodorising filter 3 and other parts become soiled, the operator may take hold of knobs 44, 44, which are provided on either side of the upper part of the forward surface of the door 25, and open it by pulling it downwards in order to detach the parts from the dust-collection member 15 for the purpose of cleaning.

At such times the hardware 35 is rotated in two stages. In other words, as may be seen from FIG. 11(a), the upper flange 38b of the U-shaped connecting member 38 in that drawing is pulled forward (towards the right in the drawing) manually, so that the first-stage operation chiefly involves the opening of the hinge 36 which is fixed on to the forward external cover plate 39, and rotating the U-shaped connecting member 38 on that axis. As the connecting member 38 rotates, the door 25 opens. By rotating around the axis of the hinge 36, the U-shaped connecting member 38 comes to straddle the upper edge 39a of the forward external cover plate 39, as is illustrated by the progression from (a) to (b) in the drawing. When the U-shaped connecting member 38 is completely astride the upper edge 39a of the forward external cover plate 39, the flange 38a on the left-hand side in (c) in the drawing is prevented from going any further by the upper edge 39a of the forward external cover plate 39, which is bent and protrudes backwards. In this way the rotation of the connecting member 38 is inhibited, as may be seen in (c). In other words, the connecting member 38 stops in a position wherein it has rotated through approximately 90° in a clockwise direction. At this stage the connecting member 38 has assumed an attitude such that the web 38c is approximately at right-angles to the forward external cover plate 39, while the flange 38b has reached a position which is at a prescribed distance in an outward direction from the forward external cover plate 39, as is depicted in (c).

Figure 12A:
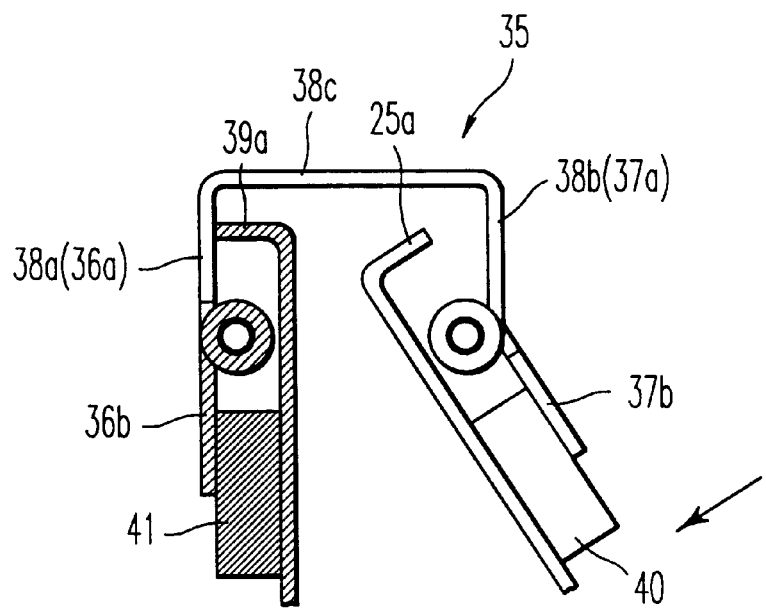
FIGS. 12(a) and 12(b) are operation diagrams which serve to illustrate the opening and closing action of the same hardware.
Figure 12B:
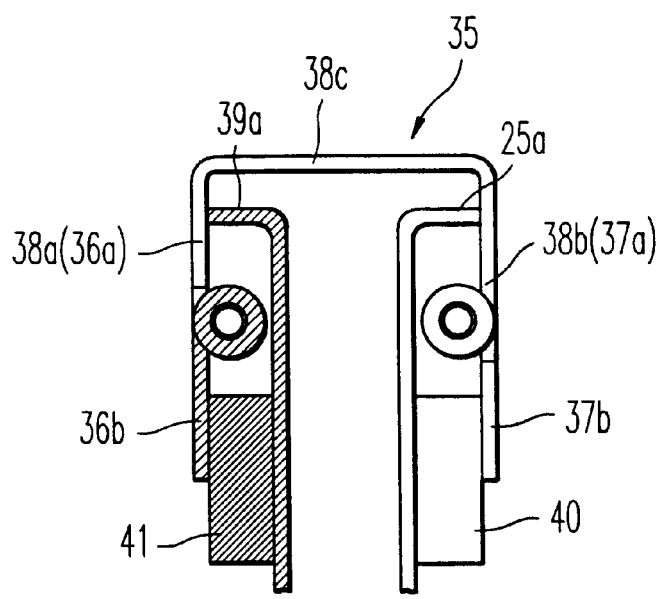

The second stage of the operation involves only the manual opening of the hinge 37 which is fixed to the door 25, and the door 25 is then rotated around that axis, as is shown in FIG. 12(a). The door 25 stops when the end of its lower edge 25a touches the rear surface of the flange 37a of the connecting member 38, as FIG. 12(b) illustrates. In other words, the door 25 stops in a position wherein it has rotated through approximately 180° in a clockwise direction.

In this manner, the door 25 is opened through approximately 180° by rotating the hardware 35 in two stages. However, since the length of the web 38c of the connecting member 38, which corresponds to the distance between the two opposing flanges 38a and 38b, is greater than the sum total of the width of the upper edge 39a of the forward external cover plate 39 and that of the lower edge 25a of the door 25 (cf. FIG. 9), there is no risk of the door 25 coming into contact with or crashing into the external cover plate of the box, however forcefully it is opened.

Thus, the mechanism for opening and closing which has been described in this embodiment ensures that because there is no risk of the door 25 coming into contact with or crashing into the external cover plate of the box even if it is opened forcefully, there is no scraping of the paint on the forward external cover plate 39 or the door 25, and that the appearance of the device is not damaged.

Moreover, the neat appearance of the device can be improved because the hardware 35 along with the upper edge 39a of the forward external cover plate 39 and the lower edge 25a of the door 25, which act as stoppers, are hidden inside the device when the door is closed.

The above is a detailed description of an embodiment of this invention, but its configuration is in no way restricted to this embodiment, and alteration to its design are also subsumed within the invention insofar as they do not deviate from essential purport thereof. For instance, the shape and dimensions of the airway 18 are not restricted to those of the embodiment above. Similarly, the connecting member may assume the curved shape of an actual inverted letter U rather than having straight sides and a flat top.

Moreover, while in the embodiment the inlet is covered with metal mesh sheeting, this may be replaced with a louvre. Conversely, a louvre is used to cover the outlet in the embodiment, but metal mesh sheeting may be substituted for this.

Figure 13:
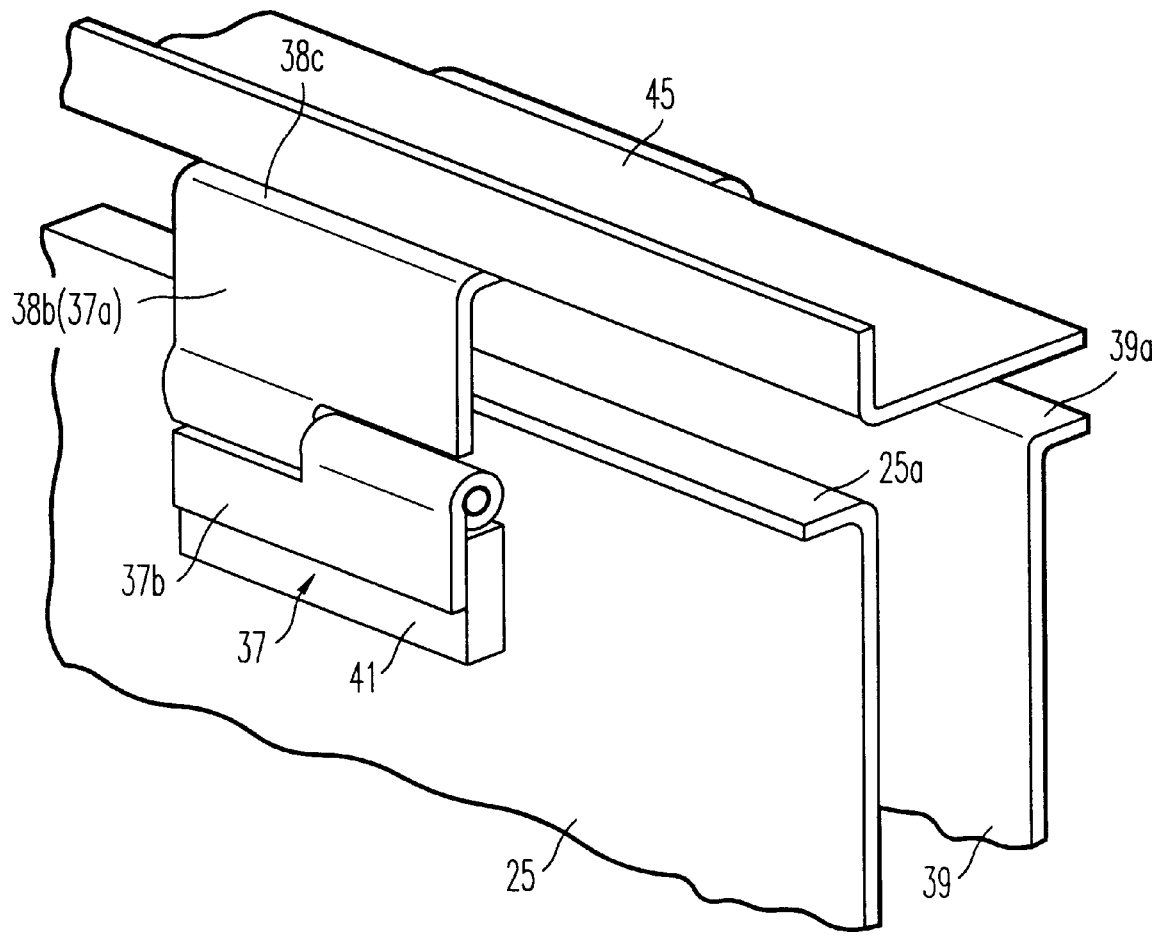
FIG. 13 is an oblique view illustrating a modified version of the same embodiment.
Figure 14:
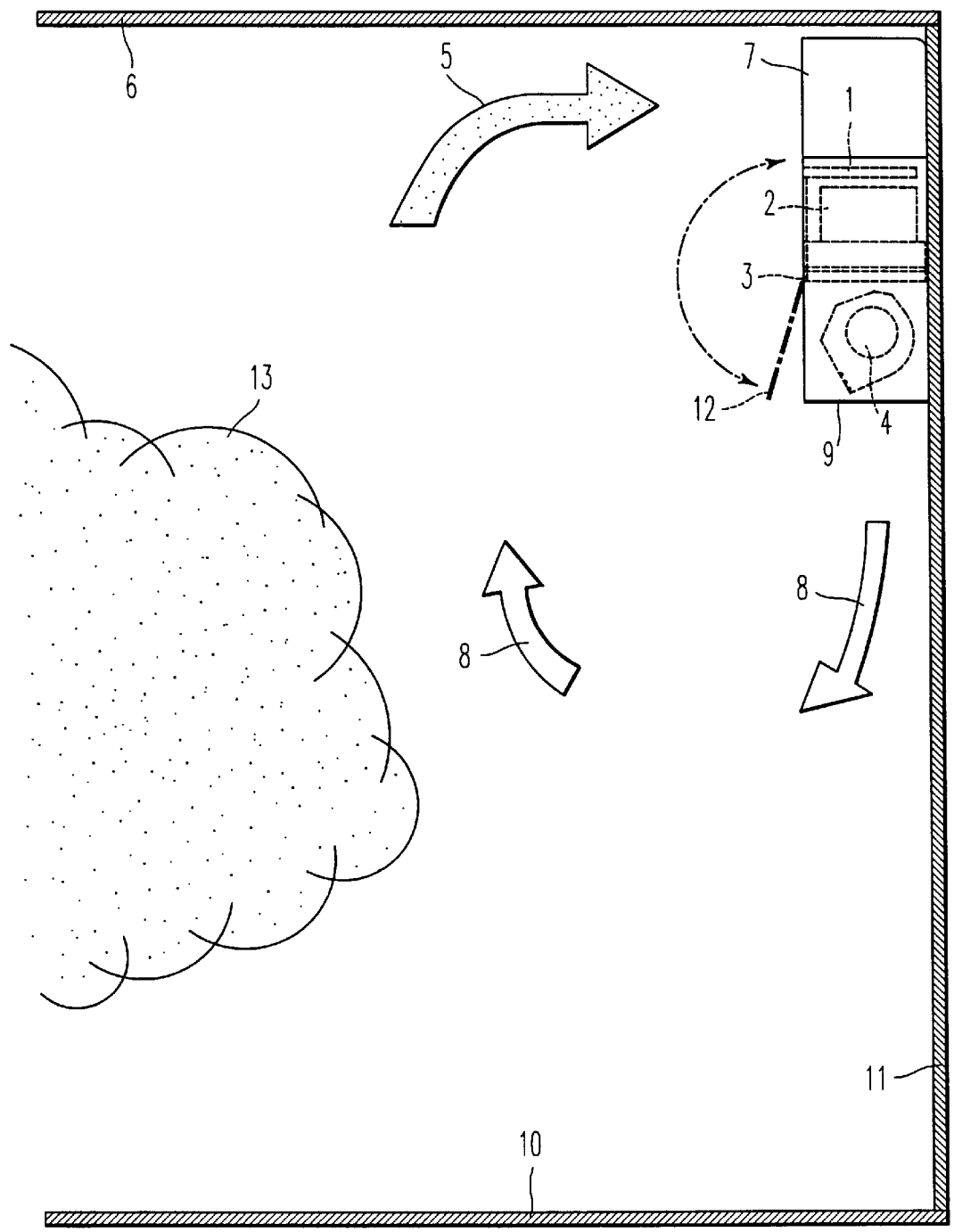
FIG. 14 is an explanatory diagram which serves to illustrate the performance of a conventional wall-mounted air-cleaning apparatus.

A possible variation on the embodiment above is illustrated in FIG. 13, where a filter presser 45 is fitted to the web 38c of the connecting member 38 in such a manner as to press against the deodorising filter 24 of activated carbon fibre or similar material housed within the dust-collection unit 15, thus further enhancing the efficient removal of odors. The filter presser 45 may have a cross-section in the shape of a letter L, a letter U or other suitable shape.

Furthermore, the airway 18 may be configured in such a manner that it can freely be attached to and detached from the wall-mounted box, so that a plurality of airways 18 may be provided and exchanged freely one for another.

What is claimed is:

1. A wall-mounted air-cleaning apparatus for collecting particulates in the air by means of electrical control, said wall-mounted air-cleaning apparatus comprising:

a wall-mounted box housing a dust-collection unit for collecting said particulates suspended in the air by imparting a corona electric charge and rendering said particulates electrostatic, said box having an air fan provided therein for blowing air, said box having an air outlet provided at a lower section thereof; and an air duct provided with an upper section of said box and defining a forward-protruding horizontally-extending airway, said air duct having an air inlet on a leading edge, said air duct being empty and serving solely as an airway.

2. An air-cleaning apparatus as defined in claim 1, wherein said air fan is housed on a downstream side of said dust-collection unit.

3. An air-cleaning apparatus as defined in claim 1 or claim 2, wherein said box includes a forward external covering having an aperture for attaching and detaching said dust-collection unit, whereby a door is fitted to said aperture such that said door can be opened and closed.

4. An air-cleaning apparatus as defined in claim 1, wherein said air duct is constructed to protrude forward for a distance of approximately 15–100 cm from a forward surface of said box.

5. An air-cleaning apparatus as defined in claim 1, wherein said air duct is detachably attached to said box.

6. An air-cleaning apparatus as defined in claim 5, having a plurality of types of said air duct which can freely be exchanged for one another.

7. An air-cleaning apparatus as defined in claim 1, wherein the dust-collection unit comprises a needle electrode having a tip and constructed to charge the particulates within the air by causing corona discharges around said tip, a tube-shaped collector electrode corresponding to said needle electrode and provided for attracting and collecting the charged particulates by means of static electricity, and a deflecting electrode arranged in such a way as to be inserted within said collector electrode for imparting a deflecting force on the charged particulates in the direction of said collector electrode.

8. An air-cleaning apparatus as defined in claim 1, wherein said box includes a forward external covering having an aperture for attaching and detaching said dust-collection unit whereby a door is fitted to said aperture such that said door can be opened and closed;

wherein said door is provided with stopper for preventing said door from being brought into contact or colliding with said forward external covering of said box when said door is open, said stopper being invisible when said door is closed.

9. An air-cleaning apparatus as defined in claim 8, further comprising a first hinge having one member fixed to the rear surface of said external covering, a first stopper for preventing the other member of said first hinge from rotating too far, a second hinge having one member fixed to the rear surface of the lower edge of said door and the other member fixed to the other member of said first hinge, and a second stopper for preventing said door from rotating too far.

10. A wall-mounted air-cleaning apparatus for collecting particulates in the air by means of electrical control, said wall-mounted air-cleaning apparatus comprising:

a wall-mounted box housing a dust-collection unit for collecting particulates suspended in the air by imparting a corona electric charge and rendering the particulates electrostatic, said box having an air fan provided therein for blowing air, said box having a pre-filter, a deodorizing filter and an air fan, said pre-filter, dust-collection unit, deodorizing filter and said air fan being positioned in that order in the direction of the air-flow, said box having an air outlet provided at a lower section thereof; and an air duct provided with an upper section of said box and defining a forward-protruding horizontally-extending airway, said air duct having an air inlet on a leading edge, said air duct being empty and serving solely as an airway.

11. An air-cleaning apparatus as defined in claim 10, wherein said box includes a forward external covering having an aperture for attaching and detaching said pre-filter, said dust-collection unit and said deodorising filter, whereby a door being fitted to said aperture whereby said door may be opened and closed.

* * * * *